United States Patent [19]

Strizki

[11] 3,951,556

[45] Apr. 20, 1976

[54] LOAD CONCENTRATED BREAKAWAY COUPLING APPARATUS

[75] Inventor: Richard A. Strizki, Ringoes, N.J.

[73] Assignee: Transpo-Safety, Inc., New Rochelle, N.Y.

[22] Filed: May 16, 1974

[21] Appl. No.: 470,371

[52] U.S. Cl. .................................. 403/2; 52/98
[51] Int. Cl.² ............................................ F16D 9/00
[58] Field of Search ................. 403/2; 285/2, 3, 4; 52/98, 99, 758 F; 85/61, 62

[56] References Cited
UNITED STATES PATENTS

| | | | |
|---|---|---|---|
| 2,085,074 | 6/1937 | Boyles | 403/2 |
| 2,249,848 | 7/1941 | O'Brien | 403/2 |
| 2,282,641 | 5/1942 | Corey | 285/2 |
| 2,305,377 | 12/1942 | Corey | 285/2 |
| 3,002,775 | 10/1961 | Mueller et al. | 285/2 |
| 3,343,322 | 9/1967 | Lurkis et al. | 52/298 |
| 3,499,630 | 3/1970 | Dashio | 52/98 X |
| 3,521,413 | 7/1970 | Scott et al. | 85/61 X |
| 3,637,244 | 1/1972 | Strizki | 403/2 X |

Primary Examiner—Andrew V. Kundrat
Attorney, Agent, or Firm—Lackenbach, Lilling & Siegel

[57] ABSTRACT

My assembly for mounting a sign post or the like on a stationary base or footing includes, in a presently preferred embodiment, a platform attached to the post near the bottom thereof and connected to the stationary base by breakaway coupling members spaced radially from the vertical axis of the post. The platform secured to the post has load concentrating elements associated therewith and located thereon, such as being formed integral therewith, and operable to equalize the load applied to the coupling members upon application of a wind load or the like to the sign at a point on the post remote from the platform whereas the coupling members will be readily broken upon impact of a vehicle with the lower portion of the post.

14 Claims, 4 Drawing Figures

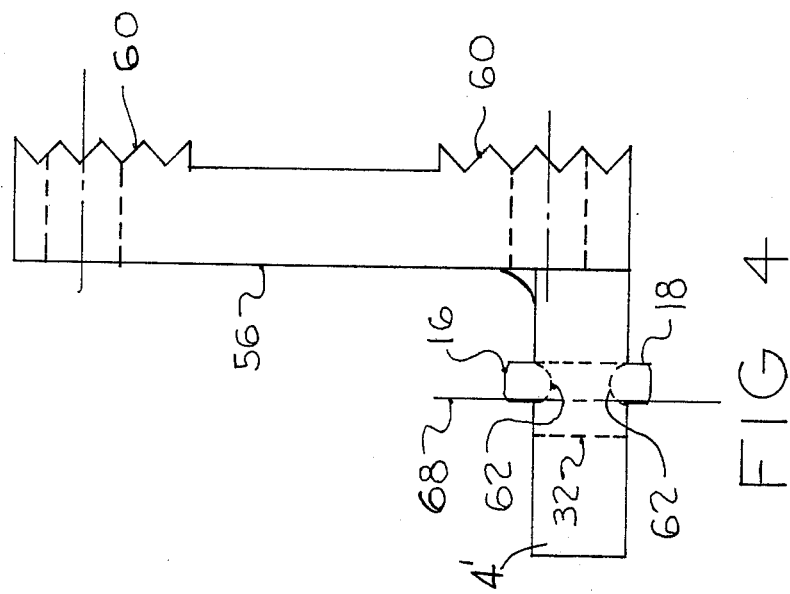
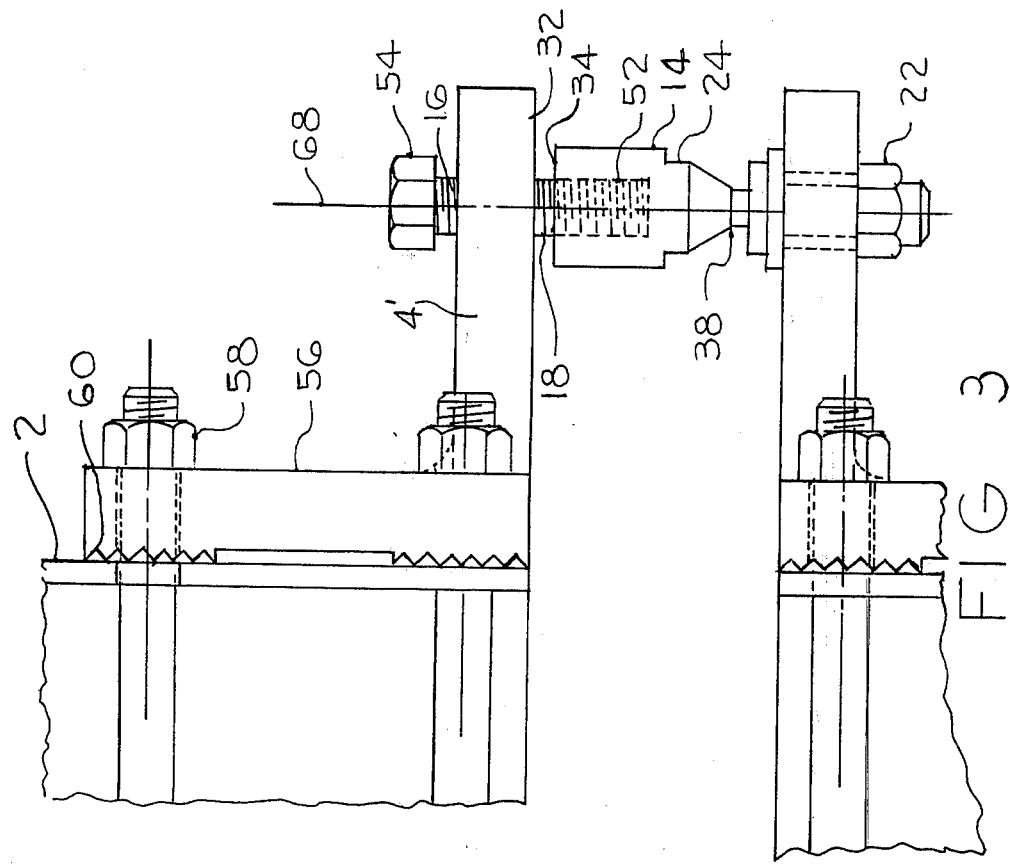

LOAD CONCENTRATED BREAKAWAY COUPLING APPARATUS

BACKGROUND OF THE INVENTION

In the interest of highway safety, it has been suggested that highway signs, utility poles and the like should be so constructed that damage to a vehicle and its passengers upon impact with an obstruction be minimized as much as possible. For this purpose, various types of breakaway couplings and yieldable supports for signs and posts have been suggested as exemplified by U.S. Pat. Nos. 2,961,204 and 3,521,917.

A further and more sophisticated breakaway coupling assembly is shown and described in applicant's U.S. Pat. No. 3,637,244. The construction of this patent has proven highly successful in extended tests by the New Jersey State Highway Department and has now been approved for use on New Jersey highways and elsewhere.

While the functioning of the device of said patent is very satisfactory it is found in practice that it presents many difficult problems in production, maintenance and installation. Thus, the numerous parts of the assembly are expensive to manufacture and require accurate casting and machining to close tolerances in order to assure proper functioning thereof. As pointed out in the example cited in said patent, a variation of as little as 0.01 foot in the positioning of the load concentrating element with respect to the breakaway coupling axes will significantly alter the operation of the assembly. Accordingly in allowing sufficient dimensional clearances in each of the various parts to permit ready assembly thereof, the load concentrating elements may be displaced or disoriented with respect to the breakaway coupling elements sufficient distances to significantly reduce or defeat the effectiveness of the assembly.

Furthermore, since at least four, and generally eight or more identical washers are used, and must be arranged with the load concentrating element of each washer positioned on the inner side of the breakaway coupling, there is always a danger that one or more of the washers will be installed improperly by a workman who does not fully understand the operation of the assembly. Thus one or more washers may be inverted or oriented with the load concentrating element located on the outer side of the breakaway coupling. If this should occur, the assembly will function improperly and may defeat the very purpose for which it is provided.

SUMMARY OF THE INVENTION

In order to overcome these objections and limitations inherent in the construction of said U.S. Pat. No. 3,637,244, an improved assembly has been developed which utilizes the principals of operations of said patent while materially reducing the number and cost of the parts employed and providing a "fool-proof" assembly wherein the proper positioning and accurate placement of the parts is assured on all installations.

For this purpose the construction of the present invention in accordance with one presently preferred embodiment embodies a platform adapted to be secured to the sign support or post in a fixed position near the lower end of the support. The load concentrating elements of the assembly are initially fixedly associated with and positioned on the platform such as being formed integral therewith when manufactured so that there is no possibility of the elements being displaced or improperly positioned with respect to the post and the breakaway couplings they are to engage. The breakaway couplings themselves may then be rotated about their vertical axes to any position to assure a proper threaded attachment to fastening means in a stationary base or footing and in applying a nut or the like to the upper end thereof for securing the platform of the support in place.

It is a major object of this invention to provide an improved load concentrated breakaway assembly for mounting a support such as a road sign or pole upon a base.

It is another object of this invention to provide an improved load concentrated breakaway assembly which comprises a minimum number of parts.

It is another object of this invention to provide an improved load concentrated breakaway assembly which facilitates ease of installation and maintenance in the field.

It is another object of this invention to provide an improved load concentrated breakaway assembly that comprises a load concentrating element which is easily and permanently aligned with regard to the axis of the supported structure and the axis of the coupling members.

It is another object of this invention to provide an improved load concentrated breakaway assembly which can be quickly serviced and installed.

It is another object of this invention to provide an improved load concentrated breakaway assembly which eliminates the need for washers to carry the load concentrating elements.

It is another object of this invention to provide an improved load concentrating breakaway assembly which integrates the load concentrating elements into the platform structure.

It is another object of this invention to provide an improved load concentrated breakaway assembly which eliminates the need for washer retainers to align adjacent coupling members or adjacent washers.

It is another object of this invention to provide an improved load concentrated breakaway assembly which greatly reduces the rotational tolerance of the load concentrating elements with respect to the abutting surfaces of the upper attachment means and the coupling members.

It is another object of this invention to provide an improved load concentrated breakaway assembly in which the rotational orientation of the coupling members can be completely random and thereby eliminate the need for a keyed upper attachment means between the platform and the coupling members.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 3 is a side elevation, partially in section, of a portion of a second preferred embodiment of the present invention; and FIG. 4 is a side elevation of the post mounting member as depicted in the preferred embodiment in FIG. 3.

DESCRIPTION OF THE PREFERRED EMBODIMENTS

Figure 1:
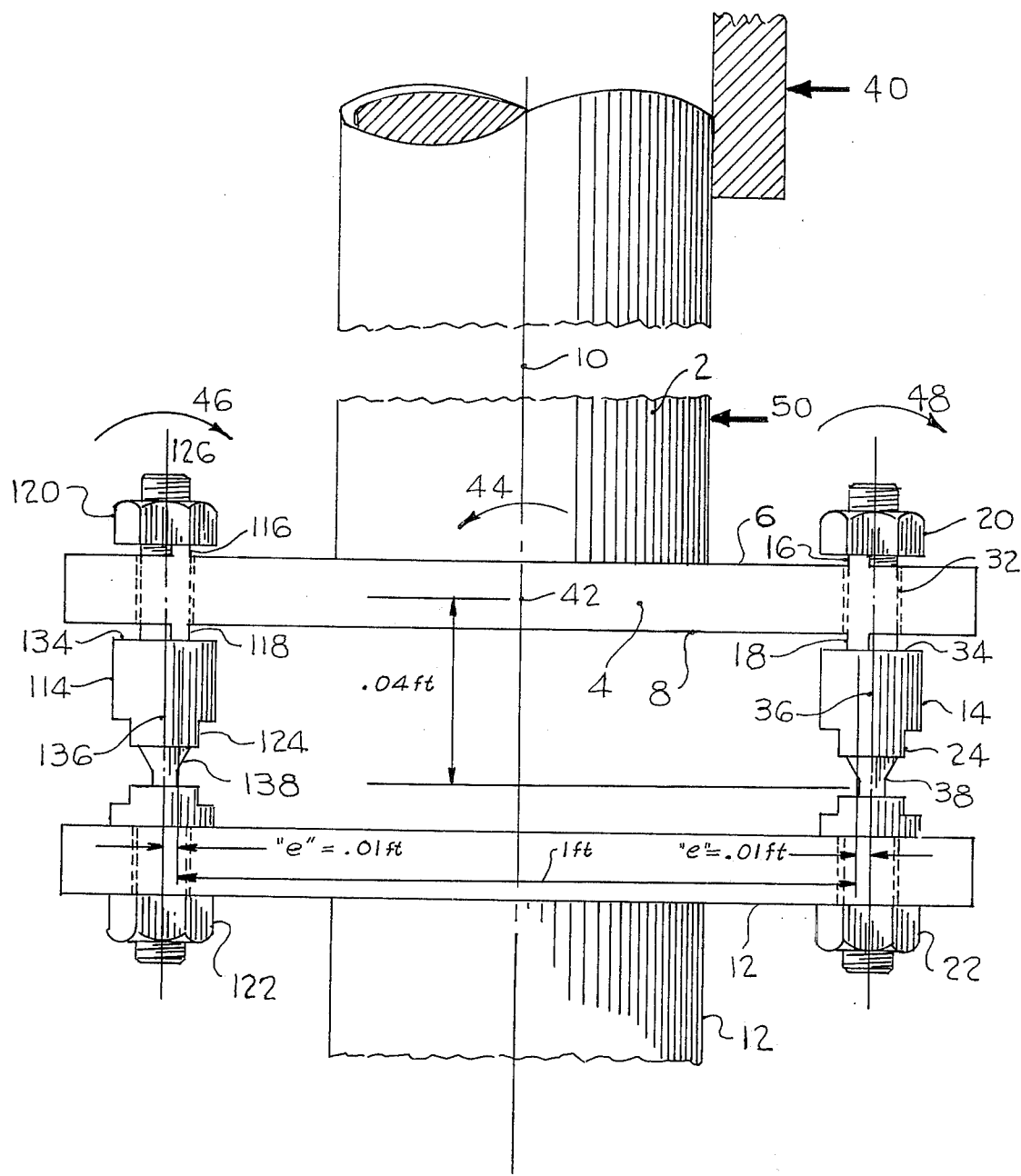
FIG. 1 is a side elevational view, partly in cross-section, of a preferred embodiment of the present invention.
Figure 2:
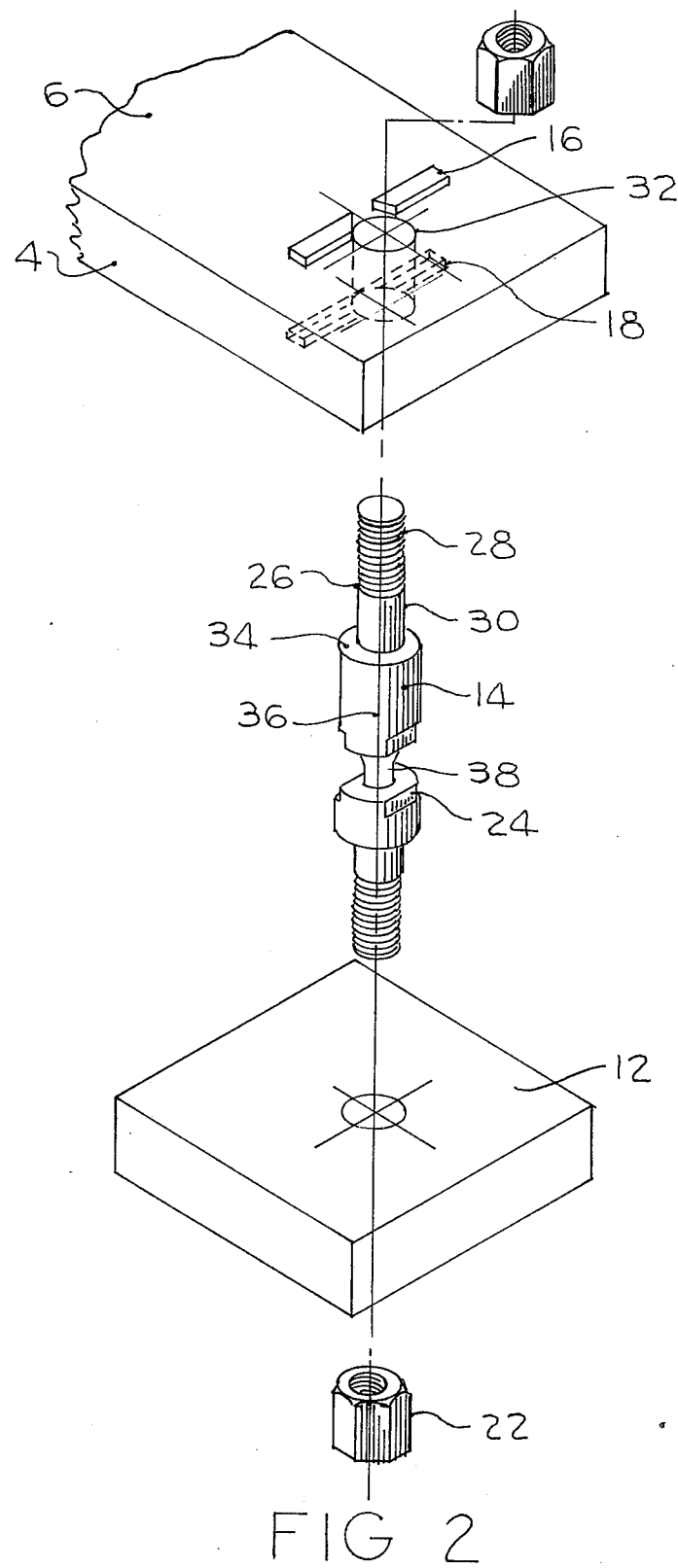
FIG. 2 is an exploded perspective view of the elements as shown in FIG. 1.

In reference to the drawings, FIGS. 1 and 2 show a first preferred embodiment of the basic structure of this invention. As shown in FIG. 1 a support or post 2 is mounted upon a support means which may be in the form of a platform 4 which has outwardly extending portions thereof or flanges each presenting an upper surface 6 and a lower surface 8. Usually the post is mounted vertically with an axis 10 which is approximately perpendicular to the upper surface 6 of platform 4. The pole 2 may be used to support a roadway sign, a telephone pole or any other roadside structure adapted to be mounted upon a pole or support.

The present invention provides a load concentrated breakaway coupling for mounting pole 2 upon a base or footing 12, which is affixed to a foundation such as the earth. Only the details for one coupling will be initially described, the identical or similar elements or parts of the other coupling shown being designated by the same reference numerals preceded by the numeral "1." The coupling illustrated includes coupling member 14, upper load concentrating element 16, lower load concentrating element 18, upper attachment means 20, lower attachment means 22. The load concentrating elements 16 and 18 are formed integral with the platform 4. As best shown in FIG. 2, the load concentrating elements are fixedly associated with and located on the support portions, such as by being integrally formed therewith by extrusion. However, the elements 16,18 may be press fitted in a groove of the platform support portions, as to be more fully described in connection with FIG. 4.

Coupling member 14 is shown as substantially cylindrical with flats 24, which serve as flat surfaces on which the coupling member 14 may be gripped by a wrench which may be required during installation or maintenance. Coupling member 14 has a reduced diameter section which forms stud 26 which has a threaded area 28 and an unthreaded area 30. Threaded area 28 is threaded to be received within a nut 20 which provides the upper attachment means. When installed stud 26 passes through hole 32 in platform 4. The length of the unthreaded area 30 of stud 26 is less than the depth of upper hole 32 such that threaded area 28 extends below upper surface 6 of platform 4 when upper nut 20 is tightened onto stud 26. The reduced diameter section which forms stud 26 also forms step 34.

When installed step 34 abuts lower load concentrating element 18 which is a projection in the form of a rib extending below lower surface 8 of platform 4. It is to be noted that the lower load concentrating element 18 is eccentric with respect to axis 36 of coupling member 14 and is oriented perpendicular to the radius arm extending from axis 10 of pole 2 to the axis 36 of coupling member 14 in the plane defined by lower surface 8.

When installed, nut 20 abuts against upper load concentrating element 16 which is a projection extending above upper surface 6 of platform 4. It is also to be noted that the upper load element 16 is also eccentric with respect to axis 36 and orientated perpendicular to the radius extending from axis 10 to axis 36 in the plane defined by upper surface 6.

At a point between the lower attachment means and step 34 of the breakaway coupling is breakaway section 38. In this embodiment the breakaway point or section 38 is formed by a taperd portion which has a region of reduced cross-sectional area. The breakaway section 38 is constructed such that it provides the least resistance to bending of any point along the axis 36 of coupling member 14. The breakaway section 38 is thus constructed so that when a bending force is applied to member 14 sufficient to break it, the breaking will always occur at breakaway point 38.

Below breakaway section 38 is the lower attachment means 22 depicted in FIGS. 1 and 2 as a nut and stud assembly. This assembly is provided with substantial lateral clearances to provide easy alignment upon installation. On the other hand hole 32 and stud 26 are of relative sizes to create as tight a fit as practical while still allowing stud 26 to pass into hole 32. By limiting these clearances, a distance $e$ from axis 36 of the coupling member 14 to the load concentrating elements 16 and 18 which is critical can be closely controlled.

Coupling member 14 is made of material having a high tensile strength yield such as greater than 165,000 psi but possessing little resistance to bending when compared to the conventional materials heretofore used for mounting supports for roadway signs and like structures.

The entire load concentrated breakaway coupling usually will use four or more coupling members, but in this first preferred embodiment two such members have been depicted to simplify description of the structure. All the coupling members of a typical assembly are usually positioned equidistant from and circumferentially about the axis 10 of pole 2.

In the first preferred embodiment as shown in FIG. 1, the coupling member 114 and all the surrounding structure are an identical mirror image of the above described structure when taken about axis 10.

For purposes of illustration, coupling member 114 is shown with flats 124 and breakaway section 138 and affixed to base 12 through a lower attachment means, nut 122. Coupling member 114 also has step 134, lower load concentrating element 118, upper load concentrating element 116 and nut 120 which provides an upper attachment means when secured onto stud 126 for securing the coupling member to platform 4.

To illustrate the operation of this invention a wind or other similar force is chosen to be applied to pole 2 at a point 40, which is assumed to be near the top of pole 2. It must be appreciated that the wind load could be exerted from any direction with the resultant horizontal vector being applied to the pole parallel to the ground and at a point relatively remote from the platform.

The wind load applied at point 40 will cause pole 2 to tend to tilt to the left from its normal position about point 42 which is where the axis of pole 2 passes through the platform 4. In other words the pole 2 will try to rotate in a counterclockwise direction about point 42. This counterclockwise moment or tendency to turn is shown by arrow 44. This rotational moment will cause platform 4 to exert a downward force on coupling member 114 at the abutting surface which is load concentrating element 118. The rotational moment force will also cause platform 4 to exert an upward force on nut 20 through the abutting surface which is load concentrating element 16. However, since element 118 is eccentric with respect to axis 136 of coupling member 114, a force will be exerted on coupling member 114 which will attempt to rotate it clockwise as shown by arrow 46. Similarly element 16 is eccentric with respect to axis 36 and will create a force on nut 20 which will act upward on coupling member 14 through stud 26 which will tend to rotate member 14 clockwise as shown by arrow 48.

The magnitude of the counteracting forces producing moments about axes 36, 136 rotating in the direction of arrows 46 and 48 can be controlled through variation in the critical distances, e between the load concentrating elements and the axes of the respective coupling members. These critical distances, e are chosen such that counteracting or compensating rotational moment produced and exerted in the directions of arrows 46 and 48 are such that they will be equal and opposite to the rotational moment created at points 38 and 138 as a result of the wind load exerted a point 40. As a result the coupling members will not be broken or substantially bent due to the expected force which may be applied to the pole at a point relatively distant from the coupling, such as 8 feet to 20 feet.

The situation presented upon impact of a vehicle with a pole differs from that presented by normal or anticipated wind loading in that the impact force is generally applied to the pole at a point which is only about 18 inches to 2 feet above the ground line and only about the same distance above the point 42 about which the pole 2 and its platform 4 will be tilted. The lever arm through which the horizontal force 50 is applied to tilt the platform on impact will then be only about 18 inches to 2 feet whereas the lever arm through which the normal wind loading or force 40 is applied to the platform 4 of the pole will be much greater and as indicated above, may be 8 or 20 feet or more.

The length of the lever arm is directly related to the designed eccentricity e of the load concentrating elements to the axes 36 and 136 for the normal load 40 and therefore produces no tilting at the zones of weakness 38 and 138. The application of load 50 near the platform cannot be satisfied by the eccentricity e and as a result the opposing rotation shown by arrows 46 and 48 on the pole 2 under impact will not balance the bending produced by force 50. The pole and its platform 4 will therefore be bodily moved to the left and the coupling members will be sharply bent at their breakaway points or sections 38 and 138. The couplings 14 and 114 will then break and release the pole from its foundation so that it will move readily and damage to the vehicle and its passengers will be minimized. At the same time the only parts of the pole assembly which need be replaced to restore the pole to its original erect position are the coupling members which are relatively inexpensive.

Let us assume that a horizontal wind force 40 of 2,000 pounds is applied to a sign supported on the pole 2 at an elevation of 20 feet above the breakaway points 38 and 138. The pole will then tend to tilt about the point 42 and will exert a bending moment of 2,000 × 20 or 40,000 foot pounds at the breakaway points 38 and 138. Such tilting of the platform will be applied through the load concentrating elements to the coupling members 14 and 114 and fastening means as vertically directed forces. These forces are applied in opposite directions and spaced inwardly from the vertical axes of the coupling members by the predetermined distance $e$ which for purposes of calculation may be 0.01 foot. Further, it may be assumed that there are four coupling members positioned a foot apart at diametrically opposite points in the assembly. In the present example the bending moment of 40,000 foot pounds will produce $40,000/(1 \times 2) = 20,000$ pounds on each coupling and will be applied to the couplings at a distance of 0.01 foot from their vertical axis. The resulting rotation applied to the coupling members tending to rotate the platform 4 to the right will then be $20,000 \times 0.01 = 200$ foot pounds per coupling. Now, the applied load of 2,000 pounds is assumed equally distributed between the four couplings and therefore the load per coupling is $2,000/4 = 500$ pounds. If the distances between the point 42 and the breakaway sections 38 and 138 projected along a line parallel to the axis 10 along the axes of the latter is assumed to be 0.40 feet, the counterclockwise rotation produced by this force on the breakaway points of the coupling will be equal to $500 \times 0.40 = 200$ foot pounds. The rotation thus being equal and opposite in direction will produce no tilting movement at the breakaway points of the coupling members 14 and 114 and the couplings will not be bent or broken.

In the situation presented upon impact of a vehicle against the pole 2, assuming an impact force of 2,000 pounds, it is assumed that the impact force 50 is applied to the pole 2 at a point 2 feet above the breakaway points resulting in $2 \times 2,000$ pounds of 4,000 foot pounds. The compensating rotation from the concentrating elements then is equal to $(4,000 \times 0.01)/(1 \times 2) = 20$ foot pounds per coupling tending to move the pole and platform 4 to the right or clockwise. The applied impact load of 2,000 pounds divided equally between the four couplings is still 500 pounds. The counterclockwise rotation produced at the breakaway points by this force is still $500 \times 0.40 = 200$ foot pounds, leaving an unbalance of $200 - 20 = 180$ foot pounds. The pole 2 and its platform 4 will therefore be forcibly thrust to the left and the coupling members will be sharply bent at their breakaway points. As a result the couplings will break releasing the pole from its support so that it will move readily upon impact.

In addition to the embodiment shown in FIG. 1 there are many other manners of utilizing this invention such as shown in the further embodiments illustrated in FIGS. 3 and 4. Similar to FIG. 1, FIG. 3 shows an assembly including a post mounting member 56 in the form of a generally L-shaped element having a platform portion 4' equivalent to the platform 4, a coupling member 14, flats 24, breakaway section 38, lower nut 22, lower attachment means, upper attachment means, lower load concentrating element 18, upper load concentrating element 16, and step 34.

In the second preferred embodiment of FIG. 3 the coupling member 14 does not include a stud 26 as in the first embodiment. The stud is replaced by a threaded bore 52 in the coupling member 14 from the top to provide a female member for forming the upper attachment means. The male member of the upper attachment means is a bolt 54 which replaces nut 20 of the first embodiment. Bolt 54 is adapted to pass through a hole 32 in platform of portion 4' and into the bore 52 in coupling member 14. In addition to completing the upper attachment means, the hex head of bolt 54 provides the surface which abuts against the upper load concentrating element 16. However, the same couplings shown in FIGS. 1 and 2 can be used in connection with the embodiments shown in FIGS. 3 and 4.

The load concentrating elements may be welded to or press fitted in suitable pre-formed openings or grooves in the apertured or platform portions 4'. In a typical application there are one or two coupling members for each post mounting member used. The shoulders 56 are formed as longitudinal extrusions as are 16 and 18 which act as load concentrating elements and are slightly eccentric with regard to the axis 68 of hole 32. The mounting members 56 are adapted to be attached to pole 2 by a conventional securing means such as nut assemblies 58. When so mounted, the post mounting members 56 are provided with a gripping means such as toothed section 60 to provide additional locking of the mounting members 56 to the pole 2.

The mounting members 56 are preferably made of a light weight metal such as aluminum. This consideration is important since the damage to a vehicle upon impact is directly proportional to the mass of the support located above breakaway points 38. Any reduction in the mass of the pole and support means or platform is welcomed. However, the use of aluminum to form load concentrating elements 16 and 18 on the platform 4 of the mounting member 56; is often not satisfactory since the great concentration of force loaded upon these extrusions would deform the metal. Therefore, it is preferable to insert into grooves 62, formed during extrusion, 56 a strip of a material harder than aluminum such as stainless steel which will serve as the load concentrating elements 16 and 18.

While two particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An improved load concentrated breakaway coupling apparatus for mounting a post or the like in a vertical position on a stationary base or footing comprising a platform secured to the post near the lower end thereof and having outwardly extending flanges presenting upwardly and downwardly facing surfaces, said flanges being provided with a plurality of openings therein each spaced a predetermined distance from the vertical axis of said post, and a plurality of breakaway coupling members in the form of bolts or the like adapted to be fixedly connected to said stationary base and extending upward through said openings in the flanges of said platform to secure said platform and post in place on said base, said breakaway coupling members being arranged with their longitudinal axes extending parallel to the vertical axis of the post and spaced radially outward therefrom, said coupling members further each having a zone of weakness therein located between said platform and said stationary base, said platform having load concentrating elements formed integral therewith and located at predetermined distances from the axis of the post and from said openings in the flanges of the platform, said load concentrating elements projecting from the upper and lower surfaces of said platform into position to contact said coupling member at points on the coupling members above and below said platform and spaced inward from the vertical axes of the coupling members to cause said coupling members to break at their zones of weakness upon the application of a laterally directed force to the post near said platform.

2. The assembly as defined in claim 1 wherein said coupling members are adapted to be rotated to any position about its vertical axis.

3. The assembly as defined in claim 1 wherein the axes of said coupling members are all parallel to each other and and parallel to and equidistant from the axis of the support.

4. The assembly as defined in claim 1 wherein said platform comprises portions of a plurality of post mounting members secured to the post and attached to each of said coupling members through attaching means, each of said mounting members including a load concentrating element integral therewith.

5. The assembly as defined in claim 4 wherein said post mounting members further comprise gripping means engageable with the post for further securing the mounting means to the post.

6. The assembly as defined in claim 4 wherein said mounting members are made from a aluminum.

7. The assembly as defined in claim 6 wherein said load concentrating elements of each mounting member are made from a metal which is harder than aluminum.

8. The assembly as defined in claim 7 wherein the load concentrating elements are made from stainless steel.

9. The assembly as defined in claim 1 wherein said coupling members are of sufficient tensile strength to sustain the weight of the support.

10. The assembly as defined in claim 1 wherein said weakened portions of said coupling members have a reduced cross-sectional area.

11. The assembly as defined in claim 1 wherein said coupling members each have upper attachment means comprising a bolt and nut assembly.

12. The assembly as defined in claim 11 wherein on each of said breakaway couplings one of said load concentrating elements is located on the upper surface of said platform and abuts said bolt and nut assembly and one of said load concentrating elements is located on the lower surface of said platform and abuts said breakaway coupling.

13. In a combination embodying a post having a vertical axis, a base fixedly secured to said post, a support for the post, a plurality of breakaway coupling members each having a vertical axis extending generally parallel to the axis of said post, said coupling members each having a zone of weakness between the upper and lower ends thereof located in a horizontal plane between the base of said post and said support, said coupling members further being spaced radially from the axis of said post and spaced circumferentially from each other, fastening means connected to the upper end of each coupling member and to the base of said post, other fastening means connected to the lower end of each coupling member and to said support, and means operable to apply substantially equally opposed balanced bending forces to said coupling members at their zones of weakness upon the application of a transverse load to an upper portion of said post and to apply unequally opposed unbalanced bending forces to said coupling members at their zones of weakness upon the application of transverse loads to a lower portion of said post, the improvement wherein said means are formed integral with said base and located at a predetermined distance inwardly from the axes of said coupling members.

14. Means for use in an assembly as defined in Claim 1 comprising a post mounting member adapted to be secured to a post adjacent the lower end of the post and having an outwardly projecting platform portion formed with an opening therethrough for receiving a breakaway coupling member, together with load concentrating elements projecting from the upper and lower surfaces of said platform portion and located eccentric to the axis of said opening a predetermined distance inward from said axis.

* * * * *